(12) United States Patent
Rooke et al.

(10) Patent No.: US 6,678,361 B2
(45) Date of Patent: Jan. 13, 2004

(54) METHOD FOR DELIVERING MESSAGES

(75) Inventors: Michael Rooke, Espoo (FI); Jarkko Sevanto, Helsinki (FI); Ahti Muhonen, Helsinki (FI)

(73) Assignee: Nokia Corporation, Espoo (FI)

( * ) Notice: Subject to any disclaimer, the term of this patent is extended or adjusted under 35 U.S.C. 154(b) by 164 days.

(21) Appl. No.: 09/971,909

(22) Filed: Oct. 5, 2001

(65) Prior Publication Data

US 2002/0044634 A1 Apr. 18, 2002

Related U.S. Application Data

(63) Continuation of application No. PCT/EP99/02763, filed on Apr. 19, 1999.

(51) Int. Cl.$^7$ .............................................. H04M 11/00
(52) U.S. Cl. ................................ 379/93.24; 379/88.17; 455/412.1
(58) Field of Search ........................... 379/93.24, 90.01, 379/93.01, 88.08, 88.09, 88.11, 88.12, 88.13, 88.17, 88.18, 88.22, 88.25; 455/412, 414; 709/206

(56) References Cited

U.S. PATENT DOCUMENTS 6,219,694 B1 * 4/2001 Lazaridis et al. ........... 709/206

FOREIGN PATENT DOCUMENTS

EP 0785661 7/1997
WO WO 98/00787 1/1998

OTHER PUBLICATIONS

International Search Report for PCT/EP99/02763.

* cited by examiner

*Primary Examiner*—Melur Ramakrishnaiah
(74) *Attorney, Agent, or Firm*—Squire, Sanders & Dempsey L.L.P.

(57) ABSTRACT

The present invention proposes a method for delivering messages in a communication network consisting of at least one terminal and a messaging functionality, said method comprising the steps of receiving a message (MM) for said terminal (MS) by said messaging functionality (MMSC); sending a notification (MMSNotify) about the presence of said message (MM) from said messaging functionality (MMSC) to said terminal (MS); deciding by said terminal (MS) due to its capabilities (CAP) and current user profile (UP) how to handle said received message (MM); replying by said terminal (MS) to the notification sent by said messaging functionality (MMSC), therewith instructing according to the result of said decision step; and handling said message (MM) by said messaging functionality (MMSC) according to said instructions.

13 Claims, 3 Drawing Sheets

METHOD FOR DELIVERING MESSAGES

This application is a continuation of PCT/EP99/02763 filed Apr. 19, 1999.

FIELD OF THE INVENTION

The present invention relates to a method for delivering messages in a communication network.

RELATED BACKGROUND ART

The $3^{rd}$ Generation Partnership Project (3GPP) currently discusses the issue of a multimedia messaging service center (MMSC) as a network element in a communication network, e.g. for the use in the general packet radio system (GPRS) and the universal mobile telecommunications system (UMTS). Unfortunately, most of it is still undefined, like the management of the capabilities and the user profile of the terminal.

The functionality of a multimedia messaging service center, from the technical viewpoint, provides a non-realtime service which operates partly in store-and-forward fashion. Additionally, multimedia messages are sent using the GPRS air interface, for example, and the contents of the messages can be text, images, speech, video clips or the like, or any arbitrary combination of these. For example, these contents can be delivered from one mobile station to another using this multimedia messaging service.

According to the service description of multimedia messaging, the content and length of the message is in principle unlimited. However, due to the various different types of terminals (e.g. mobile terminals), a large number of different capabilities of these terminals is present in the network. Consequently, each of these terminals inevitably causes its own specific restrictions and limitations, in particular with respect to the possibility of handling a multimedia message.

For example, the available storage capacity is limited and may differ between different terminals, and thus, not all of the terminals can be able to receive all possible contents. Furthermore, the capabilities of a single terminal may change dynamically, e.g. if the terminal has already received and stored a message, the remaining memory will be reduced. Similarly, the terminal can be connected or disconnected to or from other devices like laptops etc.

Moreover, in addition to the limitations caused by the terminal capabilities, the users may want to create or modify their own user profile, thereby also resulting in special restrictions. For example, a user may want to have certain types of multimedia messages to be stored in the multimedia messaging service center, forwarded to an internet address or discarded. These user defined restrictions can be based for example on the size of the multimedia message, the content-type or the sender.

As can be seen from the foregoing, there arises the problem, that certain parts of the multimedia message or even the whole message may not be managed by the recipient terminal due to a lack of capabilities to receive, store, process or display the multimedia message. Consequently, the uncontrolled transmission of multimedia messages can cause serious problems up to system failures in the terminals which may lead to at least a partly breakdown of the terminal functionality, thus being off communication.

SUMMARY OF THE INVENTION

Therefore, it is an object of the present invention to provide a method for delivering messages in a communication network consisting of at least one terminal and a messaging functionality which is free from the above drawbacks.

According to the present invention, this object is achieved by a method for delivering messages in a communication network consisting of at least one terminal and a messaging functionality, said method comprising the steps of submitting information concerning the capabilities of the terminal and a current user profile thereof from said terminal to said messaging functionality upon the occurrence of a predetermined condition; deciding by said messaging functionality according to said information how to handle a message for said terminal received by said messaging functionality; and handling said message by said messaging functionality according to the result of said decision step.

Furthermore, the object is achieved by a method for delivering messages in a communication network consisting of at least one terminal and a messaging functionality, said method comprising the steps of receiving a message for said terminal by said messaging functionality; sending a notification about the presence of said message from said messaging functionality to said terminal; deciding by said terminal due to its capabilities and current user profile how to handle said received message; replying by said terminal to the notification sent by said messaging functionality, therewith instructing according to the result of said decision step; and handling said message by said messaging functionality according to said instructions.

Furthermore, the present invention proposes a messaging functionality device comprising receiving means adapted to receive messages and information; processing means adapted to process received information data and messages; storing means; sending means adapted to send information and messages, respectively, to said terminal.

Still further, the present invention proposes a terminal device comprising receiving means adapted to receive messages and information; processing means adapted to process received information data and messages; storing means; sending means adapted to send information and messages, respectively, to said terminal.

Advantageous further developments of the present invention are as set out in the respective dependent claims.

Hence, it is an advantage of the present invention that the handling of the messages is based on the capabilities of the recipient terminal and the user profile of the corresponding subscriber. Accordingly, it is possible to correspondingly handle each message and each part of this message. In conclusion, failures or functionality breakdowns of the terminal are no longer possible and the method according to the invention further provides a large scope for the subscriber for a flexible and free participation in the network.

Preferred embodiments of the present invention are described herein below in detail by way of example with reference to the accompanying drawings.

DESCRIPTION OF THE PREFERRED EMBODIMENTS

Figure 1:
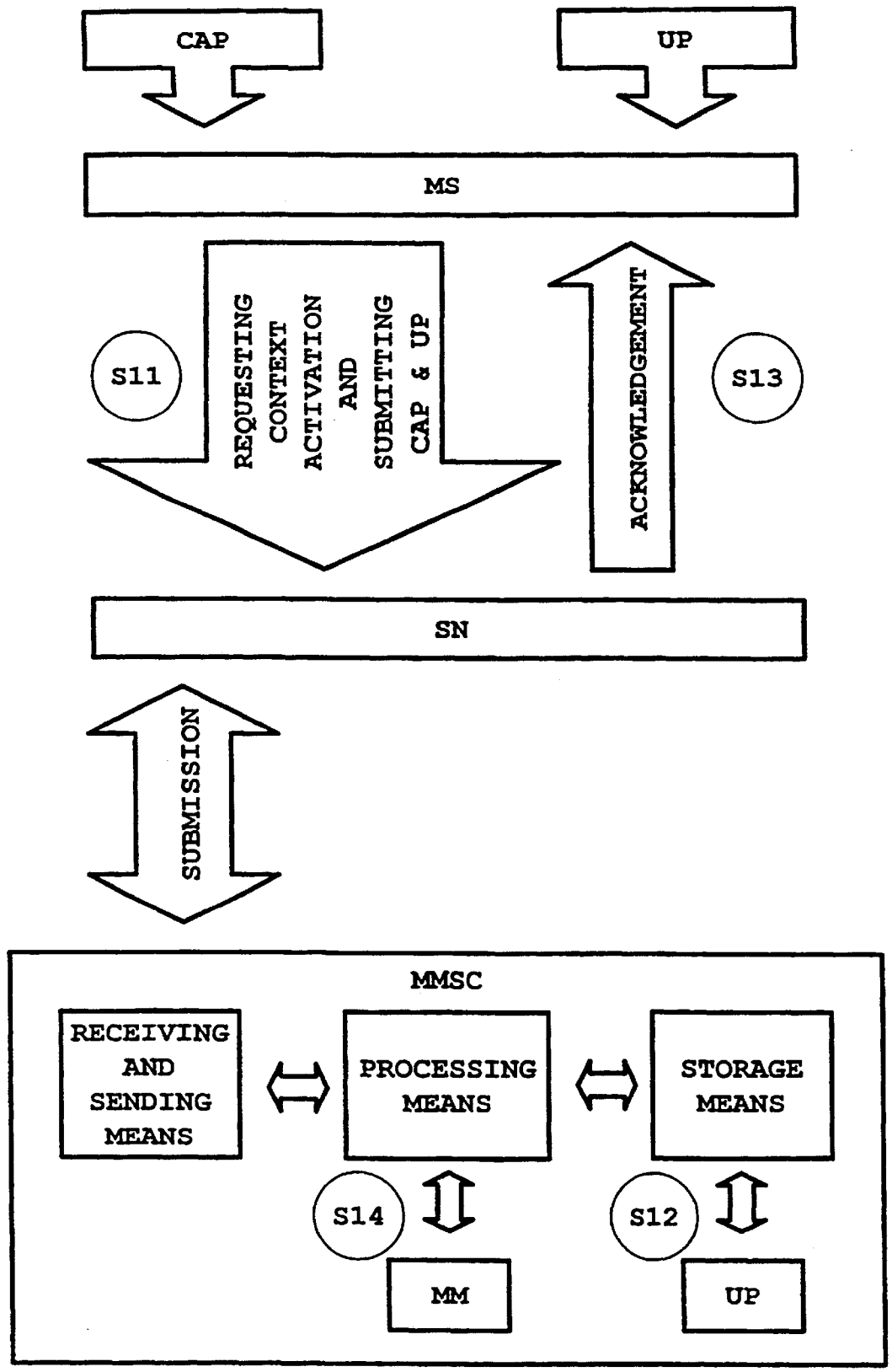
FIG. 1 shows a schematic diagram of the basic signaling sequence for transmitting a multimedia message between a multimedia messaging service center and a recipient terminal according to a first embodiment of the present invention.

According to the present invention, a submission of a multimedia message as an example for a message to be delivered in a communication network is handled according to capabilities and a user profile of a recipient terminal like for example a mobile station. The decision how to handle the submission is based on the circumstance that content(s), size and type(s) of the multimedia message, the capabilities of the terminal, and the user profile of a subscriber related to said terminal are available to respective decision means.

A handling of those messages to be delivered will be done in another element of the communication network, i.e. a network device having a messaging functionality implemented. During the following description of the preferred embodiments of the invention, the description will be made by referring to the example of a multimedia messaging service center as such a network device having implemented the messaging functionality and by referring to the example of a multimedia message as a delivered message. Nevertheless, it is to be noted that these examples are by no way limiting. Namely, also a monomedia message could be delivered and the message functionality need not be implemented in a single network device such as a multimedia messaging service center, but can also be a distributed functionality.

With respect to the above mentioned decision, for the sake of explanation, the multimedia message can be regarded as multimedia messaging service center originated while the terminal capabilities and the user profile can be regarded as being inherent to a respective terminal. Hence, information has to be transmitted in either way to enable a decision.

Further, for the sake of convenience, it would be appropriate if the decision is automated and optimized depending on the parameters provided by the terminal and the user. However, this is not a prerequisite for the present invention.

Since the multimedia message can have a certain format, multiple parts (segments), different contents (text, images, speech, videos, etc.), a different size, or a sender identity, it is apparent that it is dependent on the capabilities of the recipient terminal and the currently defined user profile, whether the terminal is able to receive, display or process the multimedia message, and further, dependent on whether the subscriber wishes to do so.

Consequently, the result of the decision as to how to handle the multimedia message can be that it shall be delivered completely, in part or modified, that it shall be discarded, stored in the multimedia messaging service center or forwarded, for example, to an internet email-address. As mentioned before, instead of an automated decision, a request to the user what to do is of course also possible, either in general or in special cases. Besides, the storage of the multimedia message in the multimedia messaging service center will in the most cases be limited to a certain time period, since there is presumably no unlimited memory available in the multimedia messaging service center (consequently, the MMSC may inform the subscriber by a respective notification about the expiry of the time period before erasing the stored message). If the multimedia message shall only be delivered in part, it is possible that also the not delivered parts are stored, forwarded or discarded. The case of a modification of the multimedia message might usually be the conversion of the multimedia message from one format to another, but also a compression or any other kind of processing the data shall be understood by this expression. As a result, a multimedia message which is not as such divided into parts can be segmented by this processing. With regard to the several possibilities of how to handle the submission of the multimedia message, the result of the decision might finally also be a respective combination of the items discussed above.

Apart from that, if the multimedia messaging service center is designated as a new network element for the general packet radio and universal mobile telecommunications systems, the data transmission will most likely be performed with protocol data units in non-realtime by use of the respective other network elements according to said systems, which other network elements are omitted from the description of the present invention for the sake of distinctness.

First Embodiment

According to a first embodiment of the present invention, the decision concerning the selection of the delivery of a multimedia message is made in the multimedia messaging service center (MMSC). The basic idea for this approach resides in the fact that, after a new multimedia message has been received, the multimedia messaging service center is immediately able to decide which type of delivery has to be selected. Stated in other words, the multimedia messaging service center acts as a pre-filter for the terminal.

To provide such a functionality, the terminal capabilities and the current user profile have to be stored in the multimedia messaging service center. Furthermore, this information has to be updated under certain conditions. If these information (terminal capabilities and user profile) and the imparted multimedia messaging service center are never changed at all, the information has to be submitted and stored once and never to be updated. Of course, these prerequisites are nearly never met. Hence, the initial information and the updates thereof have to be submitted to the multimedia messaging service centers in order to keep the information stored therein valid.

This information can include a display type of said terminal, a keyboard type of said terminal, codecs supported by said terminal, a memory size of said terminal, an electrical connection of said terminal to other devices, an external accessory attachment to said terminal or the like, and of course a current user profile.

There are several possible conditions when to submit the information from the terminal to the multimedia messaging service center and the possibility of updating is not limited to only one condition. However, the update should be coupled to the necessity to update, or at least to the possibility of submitting the information with other data (this can be any signaling sequence between these two network elements) that has to be submitted, in order to avoid a cluttering of traffic. Consequently, the condition when the terminal starts its signaling sequence to submit the information is predetermined. This condition can be a login of said terminal into said network, a change of connection conditions of said terminal, a context activation or the change of a context condition, a user profile creation or modification, a terminal originated traffic or a terminal terminated traffic, a request of said multimedia messaging service center, a notification of said multimedia messaging service center concerning the presence and/or the contents of a new multimedia message to said terminal, or the like.

With reference to FIG. 1, the signaling sequence for submitting the information about the capabilities of the terminal and the current user profile is illustrated by the example of submitting the information upon the predetermined condition of context activation.

Consequently, in a first step S11, a terminal MS such as a mobile station requests a context activation to the multimedia messaging service center MMSC via a support node SN. With this request for context activation, the terminal MS submits simultaneously its capabilities CAP and current user profile UP. According to examples of the current network being the GPRS or UMTS, the whole signaling shown in FIG. 1 can take place by using protocol data units PDU.

After this transmission has been completed, the multimedia messaging service center MMSC stores the user profile UP of the terminal MS. Due to the capabilities of the multimedia messaging service center, it may be possible or necessary to adapt the user profile UP of the terminal MS within the range of the capabilities CAP of the terminal MS. However, the user may inhibit such amendments of his preferred user profile. The storage of the user profile UP and its eventual processing is done in a step S12.

In a third step S13 at least the acknowledgement of the context activation is submitted from the multimedia messaging service center MMSC to the terminal MS via the support node SN.

However, if a multimedia message MM for the terminal MS is currently present in the multimedia messaging service center MMSC, there will be a step S14 before step S13, wherein this multimedia message MM is handled according to the user profile UP stored in the multimedia messaging service center MMSC. The handling of the multimedia message MM corresponds to the result of a decision process which is based on the capabilities CAP and the user profile UP of the terminal MS which are now stored in the multimedia messaging service center MMSC. The possible results of this decision process are discussed above in detail and it is mentioned again that according to the first embodiment, this decision is made by the multimedia messaging service center MMSC.

According to the result of this decision, the handling of the multimedia message MM may require a processing of the data of the multimedia message MM (e.g. in the cases of a modified or a partly deliverance) or not, as is mentioned above. In any case, if at least parts of the multimedia message MM have to be submitted to the terminal MS, this is done in the step S13 together with the submission of the context activation acknowledgement.

As mentioned before, the example depicted in FIG. 1 is given by way of illustration only, while the first embodiment is not limited thereto. Consequently, a respective adaptation of the process shown in FIG. 1 to the other possibilities according to the first embodiment as described above is fully apparent to those skilled in the art.

Second Embodiment

Apart from the solution according to the first embodiment, there is the alternative to maintain the terminal capabilities and user profile information only at the terminal side and consequently, to take the decision concerning the selection of the delivery of a multimedia message by the terminal.

Therefore, the basic idea of the second embodiment resides in that the terminal capabilities and user profile information is stored in the terminal, e.g. in the terminal equipment or, in the case of a mobile terminal, in the SIM or in both. Due to this, the decision regarding the delivery of a multimedia message is taken in the terminal.

The functionality of the multimedia messaging service center and of the terminal according to the second embodiment are now described with reference to FIG. 2 and FIG. 3.

Figure 2:
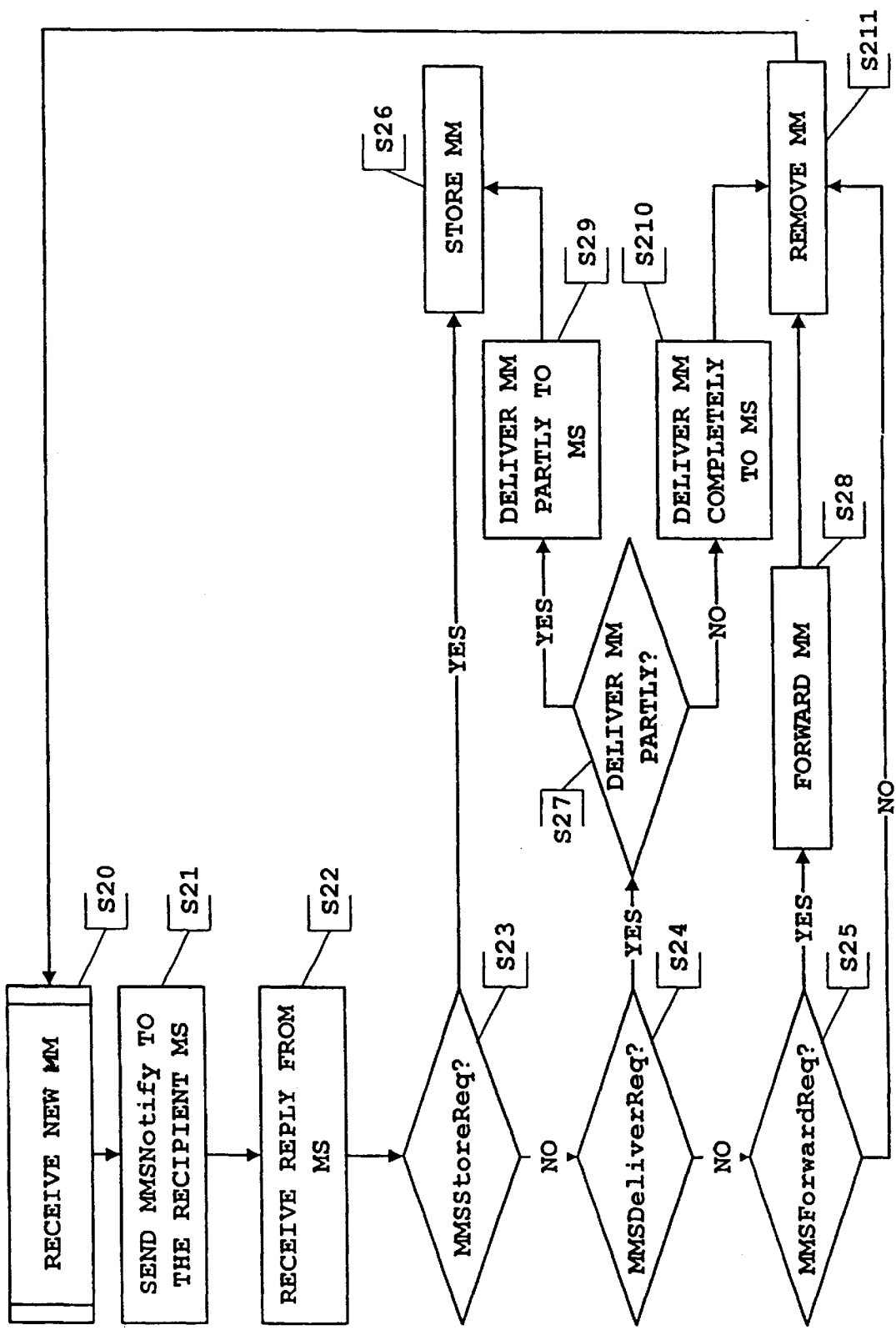
FIG. 2 shows a flow-chart illustrating an example for the functionality implemented at the multimedia messaging service center after receiving a new mobile terminated multimedia message according to a second embodiment of the present invention.

FIG. 2 illustrates an example of the functionality of the multimedia messaging service center MMSC according to this embodiment upon receipt of a new mobile terminated multimedia message MM. As can be gathered therefrom, the multimedia messaging service center MMSC automatically sends a special control message MMSNotify in a step S21 to the terminal MS after it has received a new multimedia message MM (step S20). The MMSNotify message contains information about the actual multimedia message MM such as the total size of the message, the content(s), the content type(s), a human readable description and so on.

On the basis of the stored information about the terminal capabilities CAP and its current user profile UP, the terminal MS now processes the information included in the MMSNotify message and accordingly decides how to handle the multimedia message MM. Based on this decision process, the terminal MS sends a corresponding reply message to the multimedia messaging center MMSC, which is received by the multimedia messaging service center MMSC in a step S22. This process is illustrated by way of example in FIG. 3, which will be described herein below.

It is noted that the present invention does not restrict the means by which the MMSNotify message is delivered to the terminal MS. For example, the multimedia messaging service center MMSC could send the MMSNotify message as a special SMS message, which is then parsed by the terminal MS, or the multimedia messaging service center MMSC could use a specific bearer (e.g. a control channel) dedicated to multimedia messaging service.

Anyway, the signaling sequence according to the second embodiment for the exchange of messages and information, respectively, is based upon the following principle. Upon receipt of the MMSNotify message, the terminal MS submits the MMSResultRequest message as a reply, which is received by the multimedia messaging service center MMSC in the step S22. The possible MMSResultRequest messages do, however, differ from each other due to the result of the decision process. Hence, the MMSResultRequest can be a MMSDeliverReq, a MMSStoreReq, a MMSForwardReq or a MMSDiscardReq, for example.

Hence, in a step S23, the multimedia messaging service center MMSC checks if the reply of the terminal MS is the MMSStoreReq message, and in case of "yes", the multimedia message MM is stored in the multimedia messaging service center in a step S26. In case of "no" the process proceeds further to the step S24 to check whether the reply is the MMSDeliverReq message.

If the MMSDeliverReq message was replied by the terminal MS, the process flows to a step S27, wherein the multimedia messaging service center MMSC checks the MMSDeliverReq message, whether the multimedia message shall be delivered partly or completely. The step S29 shown in FIG. 2 represents the case of a partly deliverance of the multimedia message MM to the terminal MS, followed by the above mentioned step S26, wherein at least the undelivered parts of the multimedia message MM are stored in the multimedia messaging service center MMSC. In contrast thereto does the step S210 represent the case of a completely deliverance of the multimedia message MM to the multimedia messaging service center MMSC, followed by a step S211, wherein the multimedia message MM is removed from the multimedia messaging service center MMSC after the deliverance.

If the MMSDeliverReq message was not replied by the terminal MS, there is checked in a step S25 of the process, whether the MMSForwardReq message was replied, and if not, it is assumed that the MMSDiscardReq message is present and the multimedia message MM is removed from the multimedia messaging service center MMSC according to the step S211. In case the MMSForwardReq message is present, the multimedia message MM is first forwarded in a step S28 to a destination given by the MMSForwardReq message, before it is removed from the multimedia messaging service center MMSC in the step S211.

Now the functionality of the terminal MS after receiving an MMSNotify message in a step S30 according to the step S21 of FIG. 2 is described with reference to FIG. 3.

Specifically, the terminal MS checks its capabilities CAP and user profile UP in a step S31, followed by the corresponding decision steps S32–S35. As can be seen from FIG. 3, the choice to leave the decision to the user is included as an option corresponding to the step S32. In case the user profile UP is set such that the user shall decide on the delivery of a multimedia message MM, the result of his input is carried further to the steps S33–S35. If the decision is to be done automatically, according to the second embodiment of the present invention, the terminal MS decides due to its user profile UP and capabilities CAP how to handle the multimedia message MM present in the multimedia messaging service center MMSC. Anyway, also in this case the result is carried further to the steps S33–S35.

The several choices for the terminal MS how to decide on the delivery of the multimedia message MM are discussed above, and some of these are shown in FIG. 3 as explanatory examples. That is, in step S33 the terminal checks whether the result is to retrieve the multimedia message MM partly or completely, and if this is the case, a step S37 follows, wherein the MMSDeliverReq message is sent to the multimedia messaging service center MMSC. If the multimedia message MM shall not be retrieved, but the result is checked in a step S34 that it is to be forwarded, there follows a step S38 to send the MMSForwardReq message to the multimedia messaging service center MMSC. In case the result is not to forward the message, the process flows to step S35 to check whether the result is to have the multimedia message MM to be stored in the multimedia messaging service center MMSC. If this is true, the step S39 follows which includes the sending of the MMSStoreReq message to the multimedia messaging service center MMSC, if it is not true, the step S40 follows which includes the sending of the MMSDiscardReq message to the multimedia messaging service center MMSC, assuming that this is the result of the decision process.

All of the steps S37–S40 are followed in any case by a step S41, in which the user profile is one more time checked, whether the user is to be notified by a proper notification in a step S42 about the presence of a multimedia message MM and, moreover, probably about the performed handling of it, or not. In both cases, the flow is ended until another MMSNotify message will be received.

Figure 3:
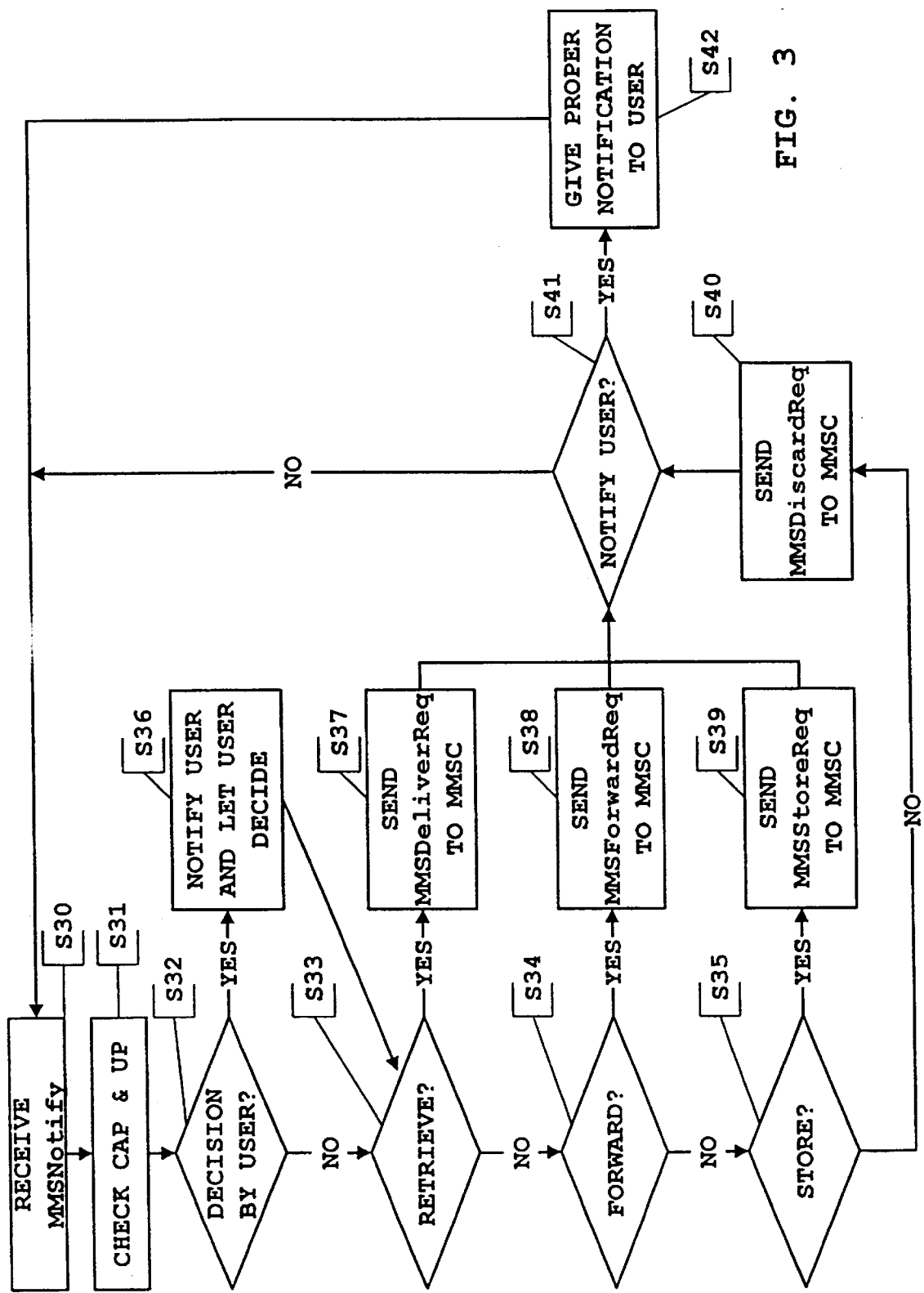
FIG. 3 shows another flow-chart illustrating an example for the functionality implemented at the terminal after receiving an MMSNotify message according to the second embodiment of the present invention.

It is mentioned, that the reply message sent by the terminal MS according to one of the steps S37–S40 of FIG. 3 is received by the multimedia messaging service center MMSC in the step S22 of FIG. 2. Further, this reply message contains in any way every information needed for the multimedia messaging service center MMSC to act according to the terminal originated decision on the delivery of the multimedia message MM.

It is noted again, that the examples depicted by FIGS. 2 and 3 are not limiting the invention, and the range of choices for the delivery of the multimedia message has been set out above in greater detail. According to the present invention, a further refinement and/or modification of the flow-charts of FIGS. 2 and 3 can easily be obtained along the lines of the description as set out above.

As a further alternative within the second embodiment, the signaling between the terminal and the multimedia messaging service center could be implemented with a single request-reply message pair. Stated in other words, the terminal could always reply to the MMSNotify message with a MMSNotifyReply message. In this case, the desired functionality of the terminal and the multimedia messaging service center can be achieved by allocating a control flag (e.g. in 2-bit representation) to each part of the multimedia message in said MMSNotifyReply message. If the value of the flag is either deliver, store, forward or discard, the terminal is able to inform the multimedia message service center with a single reply message how to handle each part of the multimedia message.

This kind of solution would allow a more flexible functionality. For example, it is fully apparent that, according to this alternative, it would be possible to instruct the multimedia messaging service center with one reply message to treat each part of the multimedia message independent and separated from the other parts, so that some parts can be delivered to the terminal, some parts can be forwarded to an internet email address etc.

However, this provides that the multimedia message is clearly defined in parts and that the multimedia messaging service center is able to handle each part separated.

According to the second embodiment, there arise the following further advantages:

The terminal capabilities and user profile information do not have to be maintained in the multimedia messaging service center, whereby both the storage and processing capacities of the multimedia messaging service center are not consumed, rather being left for other objects.

Furthermore, the information does not have to be delivered each time upon predetermined conditions to keep the information stored in the multimedia messaging service center valid. Therefore, no extra signaling is caused between the terminal and the multimedia messaging service center. In conclusion, it is guaranteed that the information is always up to date and no traffic cluttering appears due to update signaling.

Still further, no extra amount of processing has to be done in the multimedia messaging service center. Since it can be expected that the structure of the multimedia messaging service center can be left on a less complex level according to the second embodiment, i.e. the implementation of the multimedia messaging service center becomes simpler and its performance requirements decrease, there might be reasons why this embodiment could be preferable.

As is described above, the present invention proposes a method for delivering messages in a communication network consisting of at least one terminal and a messaging functionality, said method comprising the steps of receiving a message MM for said terminal MS by said messaging functionality MMSC; sending a notification MMSNotify about the presence of said message MM from said messaging functionality MMSC to said terminal MS; deciding by said terminal MS due to its capabilities CAP and current user profile UP how to handle said received message MM; replying by said terminal MS to the notification sent by said messaging functionality MMSC, therewith instructing according to the result of said decision step; and handling said message MM by said messaging functionality MMSC according to said instructions.

It should be understood that the above description and accompanying figures are only intended to illustrate the present invention by way of example only. The preferred embodiments of the present invention may thus vary within the scope of the attached claims.

What is claimed is:

1. A method for delivering multimedia messages in a communication network comprising a multimedia messaging service center (MMSC) connected to a Support Node (SN) capable of communicating with Protocol Data Units (PDU), the Support Node being further accessible to a plurality of mobile terminals for transmitting multimedia messages comprising one or more segments, said method comprising the steps of the MMSC receiving a multimedia message addressed to a particular mobile terminal;

activating a context for data transfer between the addressed mobile terminal and the support node and submitting capability information concerning the capabilities (CAP) of the addressed mobile terminal (MS) from said addressed mobile terminal to said multimedia messaging service center (MMSC) with Protocol Data Units (PDU), the capability information being capable of indicating codecs supported by said terminal;

the MMSC sending a multimedia message notification concerning the multimedia message to the addressed mobile terminal to indicate the presence of the multimedia message;

the MMSC modifying the multimedia message according to the capability information;

the MMSC sending the modified multimedia message to the addressed mobile terminal via the support node; and the addressed mobile terminal sending updated capability information to the MMSC upon the occurrence of a predetermined condition.

2. A method according to claim 1, further comprising the step of storing said capability information in said multimedia messaging service center (MMSC).

3. A method according to claim 1, wherein the modifying the multimedia message comprises changing the format of a segment of the multimedia message or deleting a segment of the multimedia message in that said message (MM) for said terminal (MS) is delivered completely, partly or modified to said terminal (MS), that said message (MM) is discarded, that said message (MM) is forwarded to another terminal, or that said message (MM) is stored in said multimedia messaging service center (MMSC).

4. A method according to claim 1, wherein said predetermined condition is at least one of the following events: a login of said terminal (MS) into said network, a change of connection conditions of said terminal (MS), a context activation or the change of a context condition, a user profile (UP) creation or a user profile (UP) modification, a terminal originated traffic or a terminal terminated traffic, a request of said multimedia messaging service center (MMSC), a notification of said multimedia messaging service center (MMSC) concerning the presence of a new message (MM) to said terminal (MS), and a notification of said multimedia messaging service center (MMSC) concerning the content, type and size of a new message (MM) to said terminal (MS).

5. A method according to claim 1, wherein said capability information comprises at least one of the following: a display type of said terminal (MS), a keyboard type of said terminal (MS), codecs supported by said terminal (MS), a memory size of said terminal (MS), an electrical connection of said terminal (MS) to other devices, an external accessory attachment to said terminal (MS), and the current user profile (UP).

6. Multimedia messaging service center device comprising receiving means adapted to receive messages (MM) and information;

processing means adapted to process received information data and messages (MM);

storing means;

sending means adapted to send information and messages (MM), respectively, to a terminal (MS), wherein said multimedia messaging service center device is adapted to perform the method according to claim 1.

7. A method for delivering messages in a communication network consisting of at least one terminal and a multimedia messaging service center, said method comprising the steps of receiving a message (MM) for said terminal (MS) by said multimedia messaging service center (MMSC);

said multimedia messaging service center (MMSC) receiving capability information concerning the capabilities (CAP) of the terminal (MS) from said terminal, the capability information being capable of indicating codecs supported by said terminal;

sending a notification (MMSNotify) that notifies about the presence of said message (MM) from said multimedia messaging service center (MMSC) to said terminal (MS), the notification containing information describing the properties of the message; deciding by said terminal (MS) based on its capabilities (CAP), current user profile (UP) and the properties of the message provided by the notification how said received message (MM) should be handled;

replying by said terminal (MS) to the notification sent by said multimedia messaging service center (MMSC), therewith instructing said multimedia messaging service center (MMSC) according to the result of said decision step; and handling said message (MM) by said multimedia messaging service center (MMSC) according to said instructions.

8. A method according to claim 7, wherein the result of said decision step can at least reside in that said message (MM) for said terminal (MS) is delivered completely, partly or modified to said terminal (MS), that said message (MM) is discarded, that said message (MM) is forwarded to another terminal, or that said message (MM) is stored in said multimedia messaging service center (MMSC).

9. A method according to claim 7, wherein said notification (MMSNotify) about the presence of said message (MM) from said multimedia messaging service center (MMSC) to said terminal (MS) further notifies about at least one of the following: content, type and size of said message (MM).

10. A method according to claim 9, wherein said terminal (MS) replies to said multimedia messaging service center (MMSC) in the course of the signaling by sending a notification reply message which contains a control flag for each part of said message (MM) for instructing the multimedia messaging service on how to handle said each part of said message.

11. A method according to claim 10, wherein the value of said control flag instructs the multimedia messaging service center to either deliver, modify, store, forward or discard said part of the message.

12. A method according to claim 7, wherein said decision step comprises a request of said terminal (MS) to the user how to handle the message (MM) and an input by the user representing the result of said decision step.

13. A terminal device comprising receiving means adapted to receive messages (MM) and information;

processing means adapted to process received information data and messages (MM);

storing means;

sending means adapted to send information and messages (MM), respectively, to a multimedia messaging service center (MMSC), wherein said terminal is adapted to perform the method according to claim 7.

* * * * *